United States Patent
Shin

(10) Patent No.: US 10,461,296 B2
(45) Date of Patent: Oct. 29, 2019

(54) BATTERY SEPARATOR FILM, NONAQUEOUS ELECTROLYTE SECONDARY BATTERY SEPARATOR, AND NONAQUEOUS ELECTROLYTE SECONDARY BATTERY

(71) Applicant: Sumitomo Chemical Company, Limited, Tokyo (JP)

(72) Inventor: Akihiko Shin, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/538,482

(22) PCT Filed: Jan. 17, 2017

(86) PCT No.: PCT/JP2017/001420
§ 371 (c)(1),
(2) Date: Jun. 21, 2017

(87) PCT Pub. No.: WO2017/130797
PCT Pub. Date: Aug. 3, 2017

(65) Prior Publication Data
US 2018/0375080 A1    Dec. 27, 2018

(30) Foreign Application Priority Data

Jan. 29, 2016   (JP) .................................. 2016-016007

(51) Int. Cl.
*H01M 2/16*     (2006.01)
*H01M 10/0525*  (2010.01)

(52) U.S. Cl.
CPC ...... *H01M 2/1686* (2013.01); *H01M 10/0525* (2013.01)

(58) Field of Classification Search
CPC .. H01M 2/1686; H01M 2/16; H01M 10/0525; H01M 10/052; H01M 10/0566
See application file for complete search history.

(56) References Cited

U.S. PATENT DOCUMENTS

2012/0077113 A1   3/2012   Kim et al.
2015/0194652 A1   7/2015   Okihiro et al.
(Continued)

FOREIGN PATENT DOCUMENTS

JP   2005-209570 A   8/2005
JP   2012-230870 A   11/2012
(Continued)

OTHER PUBLICATIONS

Office Action dated Sep. 25, 2018 in JP Application No. 2017564181 (Partial English Translation attached).
(Continued)

*Primary Examiner* — Raymond Alejandro
(74) *Attorney, Agent, or Firm* — Panitch Schwarze Belisario & Nadel LLP

(57) ABSTRACT

A battery separator film that has a small curling amount and is highly handleable is provided. The battery separator film has a curling amount W of not more than 5 mm, the curling amount W being represented by the following equation (1):

Curling amount $W=W1-W2$    (1)

where W1 is a width of a film that has been cut out in a longer side direction of the battery separator film, and W2 is a projection width of a part of the film which part is smallest in projection width when seen from a direction perpendicular to a surface of the film while the film, to which a tension of 90 N/m is applied, is stretched between two rollers that (Continued)

are provided in parallel with each other at an interval of 1 m at a temperature of 23 degrees Celsius and a relative humidity of 50%.

4 Claims, 6 Drawing Sheets

(56) References Cited

U.S. PATENT DOCUMENTS

| | | | |
|---|---|---|---|
| 2016/0268570 | A1 | 9/2016 | Wang et al. |
| 2016/0268571 | A1* | 9/2016 | Honda .............. H01M 2/1653 |

FOREIGN PATENT DOCUMENTS

| | | | |
|---|---|---|---|
| JP | 2012-529742 | A | 11/2012 |
| JP | 2014-235835 | A | 12/2014 |
| JP | 2015-110744 | A | 6/2015 |
| JP | 2015-130270 | A | 7/2015 |
| JP | 5844950 | B2 | 1/2016 |
| JP | 2016-143469 | A | 8/2016 |
| KR | 2014-0081797 | A | 7/2014 |
| KR | 2015-0068711 | A | 6/2015 |
| KR | 20150116287 | A | 10/2015 |

OTHER PUBLICATIONS

Office Action dated Feb. 28, 2018 in KR Application No. 10-2017-7008839.

Int'l Search Report dated Mar. 7, 2017 in Int'l Application No. PCT/JP2017/001420.

English Translation of International Preliminary Report on Patentability dated Aug. 9, 2018 in International Application No. PCT/JP2017/001420.

Office Action dated Aug. 16, 2017 in KR Application No. 10-2017-7008839.

* cited by examiner

BATTERY SEPARATOR FILM, NONAQUEOUS ELECTROLYTE SECONDARY BATTERY SEPARATOR, AND NONAQUEOUS ELECTROLYTE SECONDARY BATTERY

CROSS-REFERENCE TO RELATED APPLICATION

This application is a Section 371 of International Application No. PCT/JP2017/001420, filed Jan. 17, 2017, and the disclosure of which is incorporated herein by reference.

TECHNICAL FIELD

The present invention relates to a separator film for a battery (hereinafter referred to as "a battery separator film"), a separator for a nonaqueous electrolyte secondary battery (hereinafter referred to as "a nonaqueous electrolyte secondary battery separator"), and a nonaqueous electrolyte secondary battery.

BACKGROUND ART

A production process for producing a film, especially a functional film includes various drying steps such as drying after cleaning and drying after coating.

In a case where a separator film to be used as a functional film in a lithium ion secondary battery is taken as an example, Patent Literature 1 discloses a technique for providing one side of a film with a layer for achieving higher heat resistance. Specifically, Patent Literature 1 discloses a technique for coating a film with a heat-resistant coating solution by use of a coating device and thereafter causing the coated film to pass through a drier so as to dry the coated film.

CITATION LIST

Patent Literature

[Patent Literature 1]
Japanese Patent Application Publication Tokukai No. 2015-130270 (Publication date: Jul. 16, 2015)

SUMMARY OF INVENTION

Technical Problem

In order to be used as a nonaqueous electrolyte secondary battery separator, a battery separator film is required to be handleable while being laminated to an electrode. Thus, the battery separator film is more preferably less deformed after being produced.

Examples of the deformation include deformation such that the battery separator film curls toward a functional layer due to drying. The functional layer herein means a layer (e.g., a heat-resistant layer) to be provided on a base material layer by, for example, coating so that a function is imparted to the film. The curling is mainly caused by (i) shrinkage in the functional layer during drying of the film after the coating and (ii) generation in the base material layer of a stress by which the film is to curl assuming that the functional layer side is an inner side.

According to a separator film to be produced by a method described in Patent Literature 1, the curling (described earlier) occurs in a drying step. The separator film is broken during a step of laminating the separator film to an electrode, or during a step of winding the separator film, so that a trouble of a short circuit between a cathode and an anode occurs. This causes a problem of a significant decrease in yield of battery production.

The present invention has been made in view of the problem, and an object of the present invention is to provide a battery separator film that has a small curling amount and is highly handleable.

Solution to Problem

In order to attain the object, a battery separator film in accordance with an aspect of the present invention has a curling amount W of not more than 5 mm, the curling amount W being represented by the following equation (1):

$$\text{Curling amount } W = W1 - W2 \tag{1}$$

where $W1$ is a width of a film that has been cut out in a longer side direction of the battery separator film, and $W2$ is a projection width of a part of the film which part is smallest in projection width when seen from a direction perpendicular to a surface of the film while the film, to which a tension of 90 N/m is applied, is stretched between two rollers that are provided in parallel with each other at an interval of 1 m.

Advantageous Effects of Invention

A battery separator film in accordance with an aspect of the present invention is highly handleable and yields an effect of making it easy to be laminated to an electrode.

DESCRIPTION OF EMBODIMENTS

An embodiment of the present invention is described below by taking a lithium ion secondary battery separator film (which may be referred to as a "separator") as an example.

Note that an embodiment of the present invention is applicable not only to a lithium ion secondary battery separator film but also to a battery separator film different from the lithium ion secondary battery separator film.

First, a lithium ion secondary battery is described below with reference to FIGS. 1 through 3.

(Arrangement of Lithium Ion Secondary Battery)

A nonaqueous electrolyte secondary battery typified by a lithium ion secondary battery has a high energy density. Thus, such a nonaqueous electrolyte secondary battery is currently widely used not only as a battery for use in (i) devices such as a personal computer, a mobile phone, and a mobile information terminal, and (ii) movable bodies such as an automobile and an airplane, but also as a stationary battery contributive to stable electric power supply.

Figure 1:
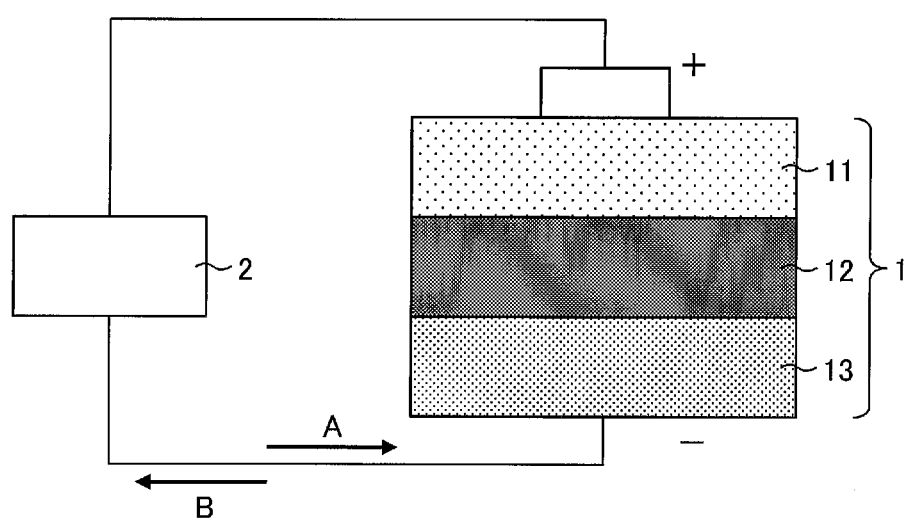
FIG. 1 schematically illustrates an arrangement of a cross section of a lithium ion secondary battery.

FIG. 1 schematically illustrates an arrangement of a cross section of a lithium ion secondary battery 1.

As illustrated in FIG. 1, the lithium ion secondary battery 1 includes a cathode 11, a separator 12, and an anode 13. Between the cathode 11 and the anode 13, an external device 2 is connected outside the lithium ion secondary battery 1. While the lithium ion secondary battery 1 is being charged, electrons move in a direction A. Meanwhile, while the lithium ion secondary battery 1 is being discharged, electrons move in a direction B.

(Separator)

The separator 12 is provided so as to be sandwiched between the cathode 11 and the anode 13, which are a positive electrode and a negative electrode, respectively, of the lithium ion secondary battery 1. While separating the cathode 11 and the anode 13, the separator 12 allows lithium ions to move between the cathode 11 and the anode 13. The separator 12 contains, for example, polyolefin (e.g., polyethylene or polypropylene) as a material thereof.

Figure 2:
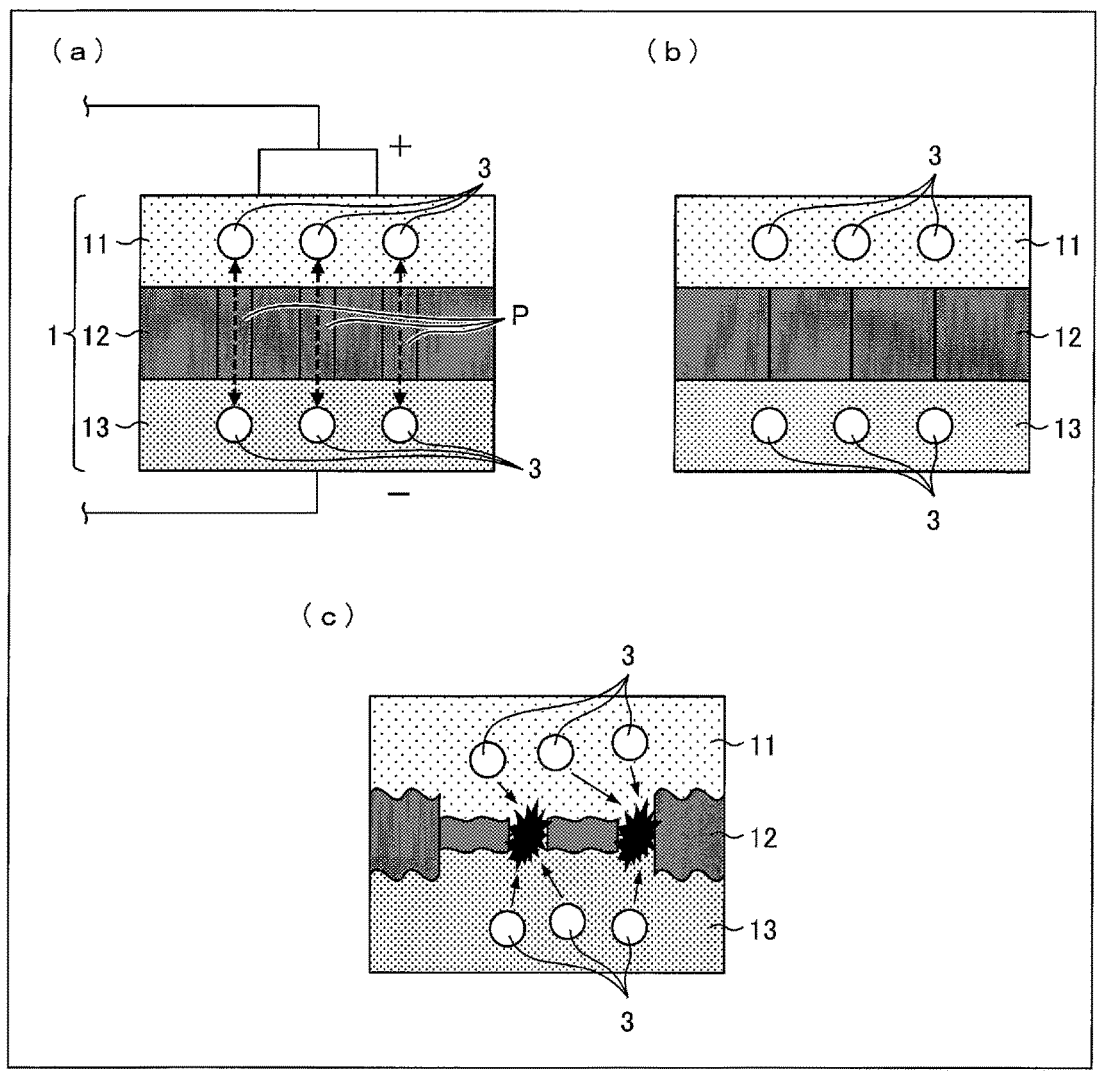
FIG. 2 schematically illustrates states of the lithium ion secondary battery illustrated in FIG. 1.

FIG. 2 schematically illustrates states of the lithium ion secondary battery 1 illustrated in FIG. 1. (a) of FIG. 2 illustrates a normal state of the lithium ion secondary battery 1. (b) of FIG. 2 illustrates a state in which the lithium ion secondary battery 1 has increased in temperature. (c) of FIG. 2 illustrates a state in which the lithium ion secondary battery 1 has sharply increased in temperature.

As illustrated in (a) of FIG. 2, the separator 12 is provided with many pores P. Normally, lithium ions 3 in the lithium ion secondary battery 1 can move back and forth through the pores P.

Note here that there may be, for example, a case where the lithium ion secondary battery 1 increases in temperature due to, for example, overcharge of the lithium ion secondary battery 1 or a large current caused by a short circuit having occurred in the external device. In such a case, the separator 12 melts or softens, and the pores P are blocked (see (b) of FIG. 2). As a result, the separator 12 shrinks. This stops the movement of the lithium ions 3 and consequently stops the increase in temperature (described earlier).

Note, however, that the separator 12 suddenly shrinks in a case where the lithium ion secondary battery 1 sharply increases in temperature. In this case, as illustrated in (c) of FIG. 2, the separator 12 may be broken. Then, the lithium ions 3 leak out from the separator 12 which has been broken, so that the lithium ions 3 do not stop moving back and forth. Thus, the increase in temperature continues.

(Heat-resistant Separator)

Figure 3:
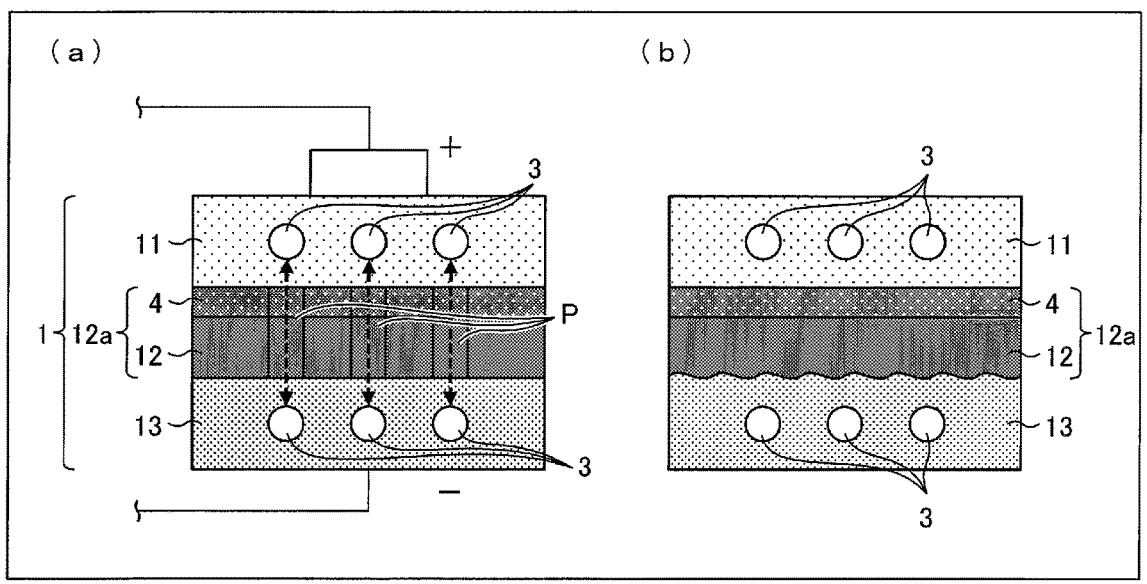
FIG. 3 schematically illustrates states of the lithium ion secondary battery which has another arrangement.

FIG. 3 schematically illustrates states of the lithium ion secondary battery 1 which has another arrangement. (a) of FIG. 3 illustrates a normal state of the lithium ion secondary battery 1. (b) of FIG. 3 illustrates a state in which the lithium ion secondary battery 1 has sharply increased in temperature.

As illustrated in (a) of FIG. 3, the lithium ion secondary battery 1 can further include a heat-resistant layer 4. The heat-resistant layer 4 can be provided to the separator 12. (a) of FIG. 3 illustrates an arrangement in which the heat-resistant layer 4, which serves as a functional layer, is provided to the separator 12. In the following description, as an example of a functional layer-attached separator, a film in which the heat-resistant layer 4 is provided to the separator 12 is regarded as a heat-resistant separator 12a. Further, in the following description, the separator 12 of the functional layer-attached separator is regarded as a base material with respect to the functional layer.

According to the arrangement illustrated in (a) of FIG. 3, the heat-resistant layer 4 is laminated to one side of the separator 12 which one side faces the cathode 11. Alternatively, the heat-resistant layer 4 can be laminated to one side of the separator 12 which one side faces the anode 13, or to both sides of the separator 12. Further, the heat-resistant layer 4 is provided with pores that are similar to the pores P. Normally, the lithium ions 3 move back and forth through the pores P and the pores of the heat-resistant layer 4. The heat-resistant layer 4 contains, for example, wholly aromatic polyamide (aramid resin) as a material thereof.

As illustrated in (b) of FIG. 3, even in a case where the lithium ion secondary battery 1 sharply increases in temperature and the separator 12 melts or softens, a shape of the separator 12, which is supported by the heat-resistant layer 4, is maintained. Thus, such a sharp increase in temperature merely results in melting or softening of the separator 12 and consequent blocking of the pores P. This stops the movement of the lithium ions 3 and consequently stops overdischarge or overcharge (described earlier). The separator 12 is thus prevented from being broken.

(Flow of Production of Functional Layer-attached Separator)

The following description discusses a flow of production of a functional layer-attached separator (functional film).

Figure 4:
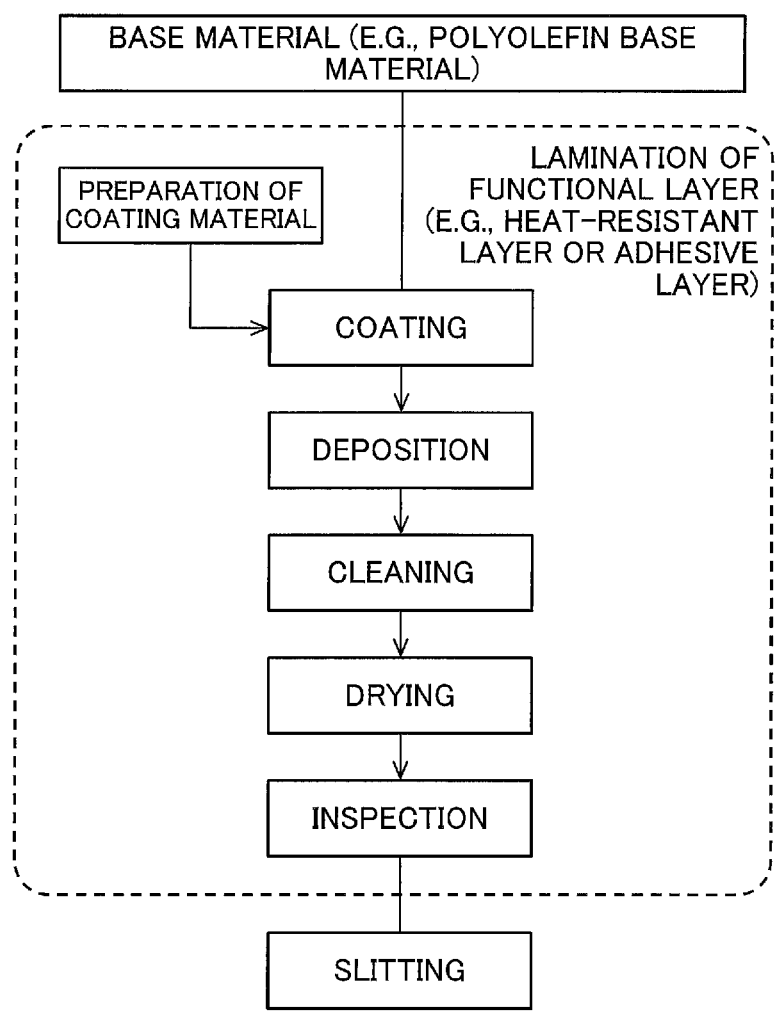
FIG. 4 shows a flow of production of a functional layer-attached separator.

FIG. 4 is a flow diagram schematically showing a process for producing the functional layer-attached separator.

The functional layer-attached separator is arranged to include a functional layer that is laminated to a separator serving as a base material.

As the base material, a film made of, for example, polyolefin is used. The functional layer is exemplified by a heat-resistant layer that allows a separator to be more thermally stable and an adhesive layer that allows the separator to more strongly adhere to an electrode. The present embodiment discusses a coating step of coating the separator 12 with a coating solution, serving as the heat-resistant layer 4, so as to produce the heat-resistant separator 12a in which the heat-resistant layer 4 is provided on a surface of the separator 12. Note, however, that an embodiment of the present invention is not limited to the present embodiment. Specifically, the separator 12 can be provided with another functional layer that is different from the heat-resistant layer 4. In this case, the separator 12 can be coated, in the coating step, a coating solution that corresponds to the another functional layer.

The coating solution for use in the coating step in accordance with an embodiment of the present invention contains a filler, a binder, and a solvent.

Examples of the filler encompass a filler made of organic matter and a filler made of inorganic matter. Specific examples of the filler made of organic matter encompass fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, ethylene tetrafluoride-propylene hexafluoride copolymer, tetrafluoroethylene-ethylene copolymer, and polyvinylidene fluoride; melamine resin; urea resin; polyethylene; polypropylene; polyacrylic acid and polymethacrylic acid; and the like. Specific examples of the filler made of inorganic matter encompass fillers made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, glass, and the like. It is possible to use (i) only one kind of filler or (ii) two or more kinds of fillers in combination.

Among the above fillers, a filler made of inorganic matter is suitable. A filler made of an inorganic oxide such as silica, calcium oxide, magnesium oxide, titanium oxide, alumina, or boehmite is more preferable. A filler made of at least one kind selected from the group consisting of silica, magnesium oxide, titanium oxide, and alumina is still more preferable. A filler made of alumina or boehmite is particularly preferable. While alumina has many crystal forms such as α-alumina, β-alumina, γ-alumina, and θ-alumina, any of the crystal forms can be used suitably. Among such various alumina crystal forms, α-alumina is the most preferable because it is particularly high in thermal stability and chemical stability.

The filler has an average particle size preferably of not more than 3 µm, and more preferably of 1 µm. Examples of a shape of the filler encompass a spherical shape, a gourd shape, and the like. An average particle size of the filler can be calculated by, for example, (i) a method in which any 25 particles are selected at a time, respective particle sizes (diameters) of those particles are measured by use of a scanning electron microscope (SEM), and an average of the 25 particle sizes is calculated or (ii) a method in which a BET specific surface area is measured, and an average particle size is calculated by spherical approximation based on the BET specific surface area. In a case where the average particle size is calculated by use of the SEM and the filler has a shape different from a spherical shape, a greatest length of each of particles of the filler is regarded as a particle size.

Alternatively, it is also possible to use, in combination, two or more kinds of fillers that differ in particle diameter and/or specific surface area.

A binder resin to be used for formation of the functional layer has a function of (i) binding together fillers that constitute the functional layer and (ii) binding a filler and a base film. The binder resin is preferably a resin that is (i) soluble or dispersible in a solvent to be used for a coating solution, (ii) insoluble in an electrolyte of a battery, and (iii) electrochemically stable in normal use of the battery. The binder resin is preferably a water-dispersible polymer or a water-soluble polymer from the viewpoint of a process and/or an environmental impact. This is because such polymers allow an aqueous solvent to be used as a solvent of a coating solution. Note that "aqueous solvent" means a solvent which contains water in an amount of not less than 50% by weight and which contains another solvent (e.g., ethanol) and an additional component provided that neither dispersibility of the water-dispersible polymer nor solubility of the water-soluble polymer is impaired.

Examples of the water-dispersible polymer encompass polyolefins such as polyethylene and polypropylene; fluorine-containing resins such as polyvinylidene fluoride and polytetrafluoroethylene; fluorine-containing rubbers such as vinylidene fluoride-hexafluoropropylene copolymer and ethylene-tetrafluoroethylene copolymer; rubbers such as styrene-butadiene copolymer and a hydrogenated one thereof, acrylic acid ester copolymer, methacrylic acid ester copolymer, acrylonitrile-acrylic acid ester copolymer, styrene-acrylic acid ester copolymer, ethylene propylene rubber, and polyvinyl acetate; and resins having a melting point or a glass transition temperature of not less than 180° C., such as polyphenylene ether, polysulfone, polyether sulfone, polyphenylene sulfide, polyetherimide, polyamide imide, polyetheramide, polyamide, and polyester.

Acrylic resins such as acrylic acid ester copolymer, methacrylic acid ester copolymer, acrylonitrile-acrylic acid ester copolymer, and styrene-acrylic acid ester copolymer are preferable because these acrylic resins are each high in property of bonding fillers together or bonding a filler and a base film together.

Resins having a melting point or a glass transition temperature of not less than 180° C., such as polyphenylene ether, polysulfone, polyether sulfone, polyphenylene sulfide, polyetherimide, polyamide imide, polyetheramide, and polyester are preferable because these resins have high heat resistance and allow better maintenance of a shape of a laminated porous film that is being heated. Among heat-resistant resins, polyetherimide, polyamide imide, polyetheramide, and polyamide are more preferable, and polyamide is still more preferable.

Examples of the water-soluble polymer encompass polyvinyl alcohol, polyethylene glycol, cellulose ether, sodium alginate, polyacrylic acid, polyacrylamide, polymethacrylic acid, and the like. Among the water-soluble polymers, cellulose ether is preferable. Specific examples of the cellulose ether encompass carboxymethyl cellulose (CMC), hydroxyethyl cellulose (HEC), carboxy ethyl cellulose, methyl cellulose, ethyl cellulose, cyan ethyl cellulose, oxyethyl cellulose, and the like. Among these cellulose ethers, CMC and HEC, each of which is highly chemically stable, are particularly preferable. In a case where there are salts, examples of the water-soluble polymer also encompass the salts.

In a case where a nonaqueous solvent is used, examples of a usable nonaqueous solvent encompass a fluorine-containing resin (e.g., polyvinylidene fluoride), polyvinylidene chloride, polyacrylonitrile, and the like.

These binder resins can be used in one kind or can be appropriately mixed to be used in combination of two or more kinds.

As described earlier, a ratio between the filler and the binder resin in the functional layer is appropriately determined in accordance with a purpose of use of the functional layer. Note, however, that a weight ratio of the filler to the binder resin is preferably 1 to 100, and more preferably 2 to 99. Especially in a case where the functional layer is a heat-resistant layer, the weight ratio is preferably 4 to 99.

The functional layer is laminated to the base material by coating the base material with, for example, a coating material that is suited to the functional layer, and drying the coated base material.

FIG. 4 illustrates a flow of production of a heat-resistant separator in a case where the functional layer is a heat-resistant layer. According to the illustrated flow, wholly aromatic polyamide (aramid resin), which is used as a material of which the heat-resistant layer is made, is laminated to a polyolefin base material.

This flow includes the steps of coating, deposition, cleaning, and drying. The heat-resistant layer which has been laminated to the base material is subjected to inspection and subsequent slitting.

(Process for Producing Functional Layer-attached Separator)

The following description discusses steps included in the process for producing the functional layer-attached separator.

A process for producing a heat-resistant separator which includes, as the functional layer, a heat-resistant layer made of aramid resin includes the following steps (a) through (i).

Specifically, the process for producing the heat-resistant separator includes (a) a base material (separator) unwinding step, (b) a base material inspecting step, (c) a coating material (functional material) coating step, (d) a deposition step carried out by, for example, humidity deposition, (e) a cleaning step, (f) a water removing step, (g) a drying step, (h) a coated article inspecting step, and (i) a winding step that are carried out in this order. Alternatively, the process for producing the heat-resistant separator may include not only the above steps (a) through (i) but also a base material producing (film-forming) step provided before the (a) base material unwinding step, and/or a slitting step provided after the (i) winding step.

The process for producing the functional layer-attached separator does not need to include all the steps (a) through (h). For example, a process for producing a heat-resistant separator which includes, as the functional layer, a heat-resistant layer made of ceramics and binder resin includes the steps (a) and (g) through (i) and does not include the steps (d), (e), and (f). In this case, in the (g) drying step, the functional layer is formed by being deposited. The process for producing the heat-resistant separator may include but does not need to include the (b) base material inspecting step.

The following description discusses the base material producing step, which is a step carried out preliminarily to the step (a), and then discusses the steps (a) through (i) in this order.

(Base Material Producing Step)

The following description discusses production of a separator original sheet film as a base material by taking, as an example, a case where the separator original sheet film mainly contains polyethylene as a material thereof.

A production method to be taken as an example is exemplified by a method in which a film is formed by adding a solid or liquid pore-forming agent to thermoplastic resin and then the pore-forming agent is removed by use of an appropriate solvent. Specifically, the base material which is made of polyethylene resin containing ultra-high molecular weight polyethylene is produced through the following steps (A) through (D) carried out in this order.

(A) Kneading Step

A (A) kneading step is a step of obtaining a polyethylene resin composition by kneading ultra-high molecular weight polyethylene and an inorganic filler such as calcium carbonate.

(B) Sheet Forming Step

A (B) sheet forming step is a step of forming a film by use of the polyethylene resin composition obtained in the kneading step.

(C) Removal Step

A (C) removal step is a step of removing the inorganic filler from the film obtained in the sheet forming step.

(D) Stretching Step

A (D) stretching step is a step of obtaining the base material by stretching the film obtained in the removal step.

According to the above production method, many micropores are provided in the film in the (C) removal step. Then, micropores in the film which has been stretched by the (D) stretching step serve as the pores P (described earlier). With this, the base material which is a polyethylene microporous film having a given thickness and a given air permeability is formed. Note that an order in which the (C) removal step and the (D) stretching step are carried out can be reversed.

In the (A) kneading step, it is possible to knead 100 parts by weight of the ultra-high molecular weight polyethylene, 5 parts by weight to 200 parts by weight of low molecular weight polyolefin having a weight average molecular weight of not more than 10,000, and 100 parts by weight to 400 parts by weight of the inorganic filler.

Note that the base material which contains material(s) besides the above materials can also be produced by a production process similar to the above production process. Note also that the method for producing the base material is not limited to the above method, in which the pore-forming agent is removed, and various methods can be used to produce the base material.

Subsequently, the following description discusses the steps (a) through (i) in this order, the steps (a) through (h) following the base material producing step. Note that though the steps (a) through (i) proceed in this order, these steps can be partially omitted depending on a kind of functional material.

(a) Base Material Unwinding Step

The (a) base material unwinding step is a step of unwinding, from a roller, the separator original sheet film serving as the base material of the functional layer-attached separator.

(b) Base Material Inspecting Step

The (b) base material inspecting step is a step of inspecting the unwound base material in advance of the subsequent coating step.

(c) Coating Material Coating Step

The (b) coating material coating step is a step of coating, with a coating material as the functional material, the base material which has been unwound in the step (a).

The following description discusses a method for laminating, to the base material, the heat-resistant layer serving as the functional layer. Specifically, the base material is coated with a coating material which serves as a coating material for the heat-resistant layer and in which alumina particles are dispersed in an NMP (N-methyl-pyrrolidone) solution of aramid. Note that the heat-resistant layer is not limited to the above aramid heat-resistant layer. For example, the base material can be coated with a coating material which serves as a coating material for the heat-resistant layer and in which alumina particles are dispersed in an aqueous carboxymethylcellulose solution.

A method for coating the base material with a coating material is not particularly limited provided that uniform wet coating can be carried out by the method. The method can be exemplified by various methods such as a capillary coating method, a slit die coating method, a spray coating method, a dip coating method, a roller coating method, a screen printing method, a flexo printing method, a bar coater method, a gravure coater method, and a die coater method.

The heat-resistant layer 4 has a thickness which can be controlled by adjusting a thickness of a coating wet film, a solid-content concentration represented by a sum of (i) a concentration of a binder contained in a coating solution and (ii) a concentration of a filler contained in the coating solution, and/or a ratio of the filler to the binder.

Note that the functional layer can be provided on only one side of the base material or on both sides of the base material.

(d) Deposition Step (Humidity Deposition Step)

The (d) deposition step is a step of depositing the coating material with which the base material has been coated in the step (c). In a case where the coating material is an aramid coating material, aramid is deposited by, for example, providing a coating surface with humidity. The aramid heat-resistant layer is thus formed on the base material.

(e) Cleaning Step

The (e) cleaning step is a step, carried out after the deposition, of cleaning the functional layer and the base material. In a case where the functional layer is the aramid heat-resistant layer, water, an aqueous solution, or an alcoholic solution, for example is suitably used as a cleaning liquid.

(f) Water Removing Step

The (f) water removing step is a step of carrying out water removal with respect to the functional layer-attached separator which has been cleaned in the step (e).

Water removal is carried out to (i) remove, before the functional layer-attached separator starts to be subjected to the following drying step, the cleaning liquid (e.g., water) which has adhered to the functional layer-attached separator, (ii) make it easy to dry the functional layer-attached separator, and (iii) prevent the functional layer-attached separator from being insufficiently dried.

(g) Drying Step

The (g) drying step is a step of drying the functional layer-attached separator which has been subjected to water removal.

A method for drying the functional layer-attached separator is exemplified by but not particularly limited to various methods such as a method of bringing the functional layer-attached separator into contact with a heated roller, and a method of blowing hot air on the functional layer-attached separator.

(h) Coated Article Inspecting Step

The (h) coated article inspecting step is a step of inspecting the dried functional layer-attached separator.

In a case where a defective part is appropriately marked during the inspection, it is possible to easily grasp a position of a defect included in a product.

(i) Winding Step

The (i) winding step is a step of winding the functional layer-attached separator which has been inspected.

The winding can be carried out by appropriately using, for example, a cylindrical core.

The wound functional layer-attached separator can be, for example, shipped, as it is, in a broad state and in a form of an original sheet. Alternatively, if necessary, the wound functional layer-attached separator can be formed into a slit separator by being slit so as to have a predetermined width. For example, the wound functional layer-attached separator is formed into a slit separator for use in a small-sized battery by being slit so as to have a width of 30 mm to 70 mm, and the wound functional layer-attached separator is formed into a slit separator for automotive use by being slit so as to have a width of 70 mm to 300 mm, though depending on design of a lithium ion secondary battery in which to incorporate such a slit separator.

(Drying Step)

As described earlier, the process for producing the battery separator film in accordance with an embodiment of the present invention includes the (g) drying step. The (g) drying step is carried out to remove, by drying, the cleaning liquid which has adhered to the functional layer-attached separator in the (e) cleaning step, or a solvent contained in the coating material with which the base material has been coated in the (c) coating material coating step.

A method for carrying out the drying can be exemplified by but not particularly limited to roller heating. The roller heating is a method for drying the functional layer-attached separator by bringing the functional layer-attached separator into contact with a heated roller. A method for heating a roller is exemplified by a method of pouring a heating medium such as warm water into the roller and circulating the heating medium.

Alternatively, it is possible to use, for example, hot-air drying as another method for carrying out the drying. A method in which hot-air drying is used is, for example, a method of drying the functional layer-attached separator by blowing hot air on the functional layer-attached separator. A method of generating hot air is exemplified by, for example, a method of causing a blower to send out air heated by being brought into contact with a heat source.

The above drying methods can also be appropriately combined. For example, the functional layer-attached separator which is transferred while being in contact with a heated roller can be dried by blowing hot air thereon.

(Embodiment)

The following description discusses an embodiment of the present invention.

(Heat Treatment in Drying Step)

A battery separator film in accordance with an embodiment of the present invention can be obtained by carrying out a heat treatment with respect to a film (battery separator film) in the drying step so as to cause shrinkage in a base material.

Figure 7:
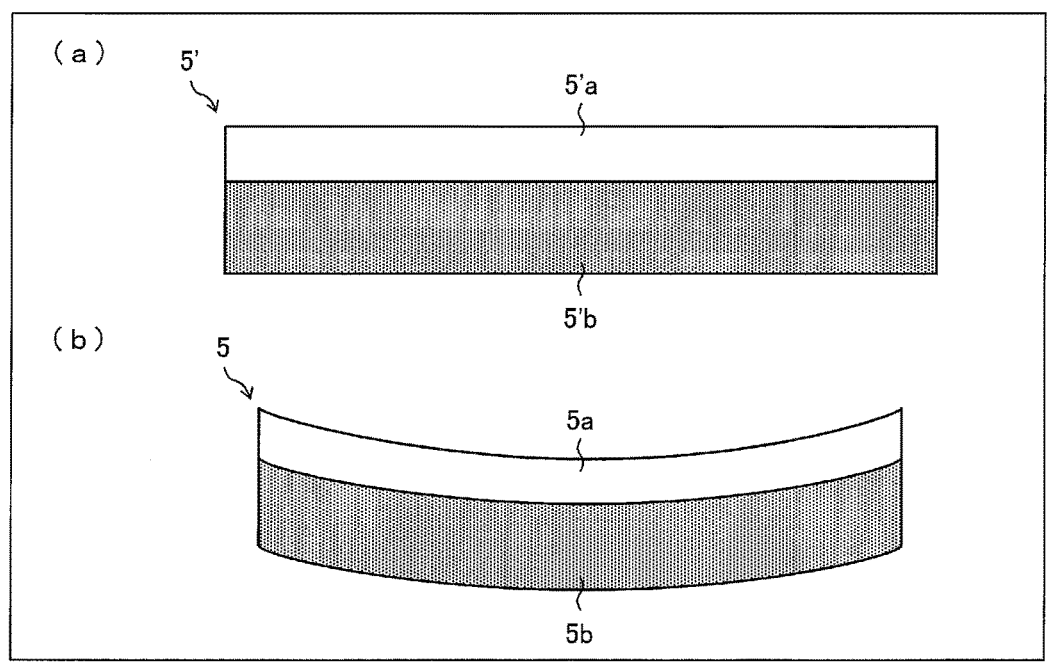
FIG. 7 is cross-sectional views of a film for explaining a principle of occurrence of curling.

As illustrated in FIG. 7, in a case where a functional layer is formed by coating a surface of a base material with a coating material, shrinkage in the functional layer occurs during the formation of the functional layer. In a case where shrinkage equivalent to the shrinkage in the functional layer occurs also in the base material layer so as to be balanced with the shrinkage in the functional layer, curling in the film is reduced. Normally, the base material has a thickness of 3 µm to 20 µm, the functional layer has a thickness of 0.5 µm to 10 µm, and the battery separator film is extremely thin. Thus, a difference in interlayer stress prominently appears in curling.

As illustrated in FIG. 2, the separator 12 has a characteristic of shrinking by being heated. Meanwhile, in the functional layer including the heat-resistant layer 4, shrinkage caused by evaporation of the cleaning liquid occurs, but shrinkage caused by an increase in temperature does not occur. This is because a shape of the functional layer is fixed during deposition.

According to an embodiment of the present invention, a battery separator film that has a smaller curling amount can be obtained by carrying out a heat treatment with respect to a film in a drying step so as to cause shrinkage in a base material layer.

EXAMPLES

An example of the present embodiment is described below with reference to FIGS. 5 through 8.

According to the present example, sizes of curling having occurred were compared by appropriately changing, in a drying step of a process for producing a film, (i) a combination of roller heating and hot-air drying and/or (ii) respective drying conditions of the roller heating and the hot-air drying.

Sizes of curling in a produced film can be quantitatively compared by employing measurement of a curling amount W described below.

(Curling Amount)

Next, a curling amount W of a produced film is described below.

Figure 5:
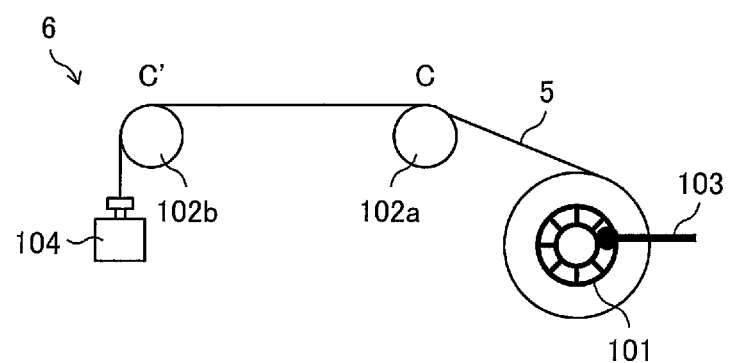
FIG. 5 schematically illustrates a curling amount measuring device of Example.

FIG. 5 schematically illustrates a measuring device for use in measurement of a curling amount W of a film 5 produced through the production process (described earlier).

A measuring device 6 includes a core 101, a roller 102a and a roller 102b, a stopper 103, and a weight 104.

The roller 102a and the roller 102b are provided so as to be parallel with a width direction of the film 5 at an interval of 1 m. The roller 102a and the roller 102b each have a diameter of 45 mm and a width of 100 mm. In this case, since the film is allowed to pass through respective upper parts of the roller 102a and the roller 102b, a distance between C and C' (a length between C and C') is 1 m, which is a center-to-center distance between the rollers, where C is a point of contact between the roller 102a and the film 5, and C' is a point of contact between the roller 102b and the film 5.

First, the film 5 produced by the production process (described earlier) is slit, cut out in a longer side direction thereof, and then wound on the core 101 with the functional layer side faceup. The film is slit so as to have a width of, for example, 58 mm to 62 mm.

The curling amount W is measured by unwinding the film 5 from the core 101 under conditions of a temperature of 23 degrees Celsius and a relative humidity of 50% so that the film 5 passes through the roller 102a and the roller 102b in this order. After the film 5 has been unwound, the core 101 is fixed by use of the stopper 103 so as not to rotate, and a weight is provided to a tip of the film 5. In this case, a mass of the weight is determined so that a tension is applied to the film 5 at 90 N/m.

Figure 6:
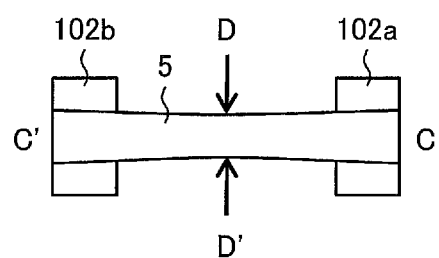
FIG. 6 is an enlarged view of CC' illustrated in FIG. 5 and seen from above.

FIG. 6 is an enlarged view of a space, seen from above, between (a) C, which is a point of contact between the roller 102a and the film 5 of FIG. 5, and (b) C', which is a point of contact between the roller 102b and the film 5 of FIG. 5.

Since the roller 102a and the roller 102b are substantially horizontally provided so as to be parallel with each other, the length between C and C' is equal to a distance between centers of the two rollers, i.e., an interval between the rollers.

In this case, the film 5 curls toward the functional layer side.

(Principle of Occurrence of Curling)

A principle of occurrence of curling is described below with reference to FIG. 7.

FIG. 7 is cross-sectional views of the film 5, when seen in a longer side direction thereof, for explaining the principle of occurrence of curling in the film 5.

A film 5' of (a) of FIG. 7 shows a structure obtained in a case where no curling occurs in the film 5, e.g., in a case where the film 5 has not been subjected to the drying step.

The film 5' includes a functional layer 5'a and a base material 5'b. The functional layer 5'a includes, for example, a heat-resistant layer. Normally, the functional layer 5'a is formed by being coated with the base material 5'b.

The functional layer 5'a which has not been dried contains a solvent (or a cleaning liquid). Thus, in a case where the film 5' is heat-treated in the drying step, the solvent (or the cleaning liquid) evaporates, so that the functional layer 5'a attempts to shrink.

Note, however, that since the functional layer 5'a shrinks under control of the base material 5'b, a force by which the base material 5'b is to shrink toward the functional layer 5'a side is also exerted on the base material 5'b.

In a case where shrinkage thus occurs, it is possible to obtain the film 5 shown in (b) of FIG. 7.

The film 5 of (b) of FIG. 7 shows a structure obtained after the film 5' has curled. The film 5 includes a functional layer 5a and a base material 5b. The functional layer 5a is the functional layer 5'a which has been dried, and the base material 5b is the base material 5'b which has been dried.

As described earlier, the film 5 of FIG. 6 is deformed toward the functional layer side. Thus, the film 5 which is seen from above has a part that is apparently narrow.

In a case where the film 5 is seen from above, edges of a place that seems to be narrowest in a space between C and C' are D and D', respectively, as illustrated in FIG. 6.

In a case where the film 5 has a narrower apparent width at a position, the film 5 has a larger curling amount at that position. Thus, DD' is a place where the film 5 has the largest curling amount in the space between C and C'.

Figure 8:
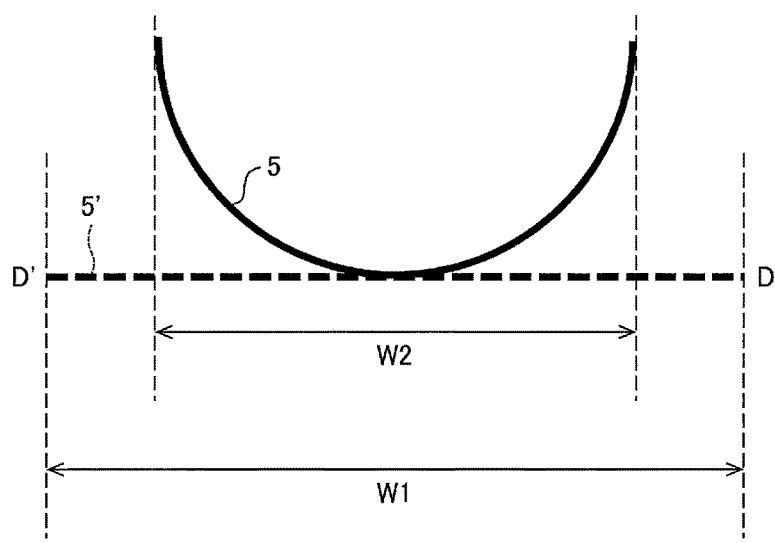
FIG. 8 is a cross-sectional view of DD' illustrated in FIG. 6 and seen in a direction in which CC' of FIG. 6 extends.

FIG. 8 is a cross-sectional view of DD' illustrated in FIG. 6 and seen in a direction in which CC' of FIG. 6 extends.

As illustrated in FIG. 8, the film 5 curls toward the functional layer side, which is the upper surface side of the film 5. This causes the film 5 which is seen from above to have a narrow apparent width.

The film 5' shown with a broken line indicates a shape obtained in a case where the film 5 does not curl.

W1 and W2 are determined as shown in FIG. 8. Specifically, it is determined that W1 is a width of the film 5' and W2 is a projection width of a part of the film 5 which part most curls, the projection width being obtained when the part is seen from a direction perpendicular to a surface of the film. In this case, since the film 5' and the film 5 are equal in width, W1 can be set as a width of the film 5.

The curling amount W is thus found based on the following equation (1):

$$\text{Curling amount } W = W1 - W2 \qquad (1)$$

A method for measuring W1 and W2 is not particularly limited. Examples of the method include a measurement method by use of an optical width measuring device, a measurement method by use of ultrasonic waves, a measurement method by use of vernier calipers, and the like.

A film that less curls is more handleable while being laminated to an electrode.

Since greater curling causes W2 to have a smaller value, greater curling causes an increase in curling amount W in accordance with the above equation (1).

That is, the curling amount W quantitatively shows a size of curling in the film 5. This makes it possible to say that the film 5 which has a smaller curling amount W is less deformed.

(Results of Measurement of Curling Amount W)

TABLE 1

| | Thickness of Base Material μm | Thickness of Functional Layer μm | Roller temperature ° C. | Blast temperature ° C. | Transfer tension N | Curling amount W mm |
|---|---|---|---|---|---|---|
| Conventional Example | 13 | 3 | 98 | 98 | 120 | 5.41 |
| Example 1 | 13 | 3 | 105 | 105 | 120 | 3.65 |
| Example 2 | 13 | 3 | 110 | 105 | 120 | 2.09 |
| Example 3 | 13 | 3 | 110 | 105 | 90 | 0.36 |

Table 1 shows measured values of curling amounts W of films 5 produced in the present Examples. Note that of a plurality of films (a roll) obtained by slitting, a film that is located at a center in a width direction of a film that has not been slit into the plurality of films is used for the measurement.

The item "Roller temperature" shows a temperature of a roller during the roller heating of the drying step.

The item "Blast temperature" shows a temperature of hot air sent during the hot-air drying of the drying step.

The item "Transfer tension" shows a tension per 1 m which tension is exerted on a film 5 which is being transferred in the drying step.

The item "Curling amount W" shows a measured value of each of the curling amounts W of the films 5 produced under the respective drying conditions. Note that the films used in Table 1 each have W1 of 61 mm.

In the present Examples, the films 5 were produced by changing the drying conditions, under which to carry out the drying step, in Conventional Example and Examples 1 through 3, respectively, and respective curling amounts W of the produced films 5 were measured.

(Effect of the Present Embodiment)

As shown in Table 1, in a case where (a) Conventional Example and (b) Examples 1 and 2 are compared, Examples 1 and 2, which are higher in roller temperature and blast temperature, i.e., higher in drying capability than Conventional Example, are lower in value of curling amount W than Conventional Example while (a) Conventional Example and (b) Examples 1 and 2 are identical in transfer tension.

This reveals that an increase in drying capability in the drying step makes it possible to reduce curling in the film 5.

This is because of the reason below. Specifically, as described earlier, the base material layer shrinks by being heated, and the shrinkage in the base material layer is balanced with the shrinkage in the functional layer.

As described earlier, both the roller temperature and the blast temperature are preferably not less than 100 degrees Celsius so as to cause the shrinkage in the base material layer by heating.

Too considerable shrinkage in the base material layer causes, for example, a problem such that an air permeability of the film 5 is affected, or a problem such that the film 5 which can be employed as a product has a smaller width. In view of this, both the roller temperature and the blast temperature are preferably not more than 130 degrees Celsius.

Next, as shown in Table 1, in a case where Example 2 and Example 3 are compared, Example 3, which is lower in transfer tension than Example 2, is lower in value of curling amount W than Example 2 while Example 2 and Example 3 are identical in drying capability.

This reveals that lowering of a drying tension in the drying step makes it possible to reduce curling in the film 5.

This is because a low drying tension prevents the film 5 from being strongly pressure-bonded to the roller in the drying step and thus the shrinkage in the base material layer with respect to the width direction easily occurs.

As described earlier, the transfer tension is preferably not more than 140 N/m so that the shrinkage in the base material layer is sufficiently caused. Further, the transfer tension is more preferably not more than 115 N/m.

In addition, since a too low transfer tension causes the film 5 to meander, the transfer tension is preferably not less than 25 N/m.

CONCLUSION

As described earlier, the curling amount W can be reduced by controlling a drying condition and/or a transfer tension so that the base material layer of the film 5 shrinks at a certain level.

The curling amounts W of the films 5 produced in the Examples 1 through 3 each fall below 5 mm. A battery separator film (laminated porous film) that has a curling amount W falling below 5 mm is sufficiently handleable while being laminated to an electrode. This facilitates a step of the lamination.

A battery separator film that satisfies the above range of the curling amount W is preferable to be used as a nonaqueous electrolyte secondary battery separator.

A nonaqueous electrolyte secondary battery that is produced by use of a nonaqueous electrolyte secondary battery separator is so excellent as to have a high load characteristic and allow the separator to carry out an excellent shutdown function.

REFERENCE SIGNS LIST

1 Lithium ion secondary battery (nonaqueous electrolyte secondary battery)
4 Heat-resistant layer (functional layer)
5 Film (battery separator film)
5a Functional layer (after drying)
5b Base material (after drying)
5' Film (having no curl)
5'a Functional layer (before drying)
5'b Base material (before drying)
6 Measuring device
11 Cathode
12 Separator (base material)
12a Heat-resistant separator (functional layer-attached separator)
13 Anode
101 Core
102a, 102b Roller
103 Stopper
104 Weight

The invention claimed is:

1. A battery separator film which curls with respect to a width direction of the battery separator film, the battery separator film being a laminated porous film including a functional layer having a uniform thickness comprising a wholly aromatic polyamide, wherein the functional layer is provided on only one surface of the laminated porous film;
   wherein the battery separator film exhibits a difference of not more than 5 mm between (i) a width of the battery separator film and (ii)
   a projection width of a part of the battery separator film which part is smallest in projection width when seen from a direction perpendicular to a surface of the battery separator film while the battery separator film, to which a tension of 90 N/m is applied, is stretched between two rollers that are provided in parallel with each other at an interval of 1 m at a temperature of 23 degrees Celsius and a relative humidity of 50%.

2. The battery separator film as set forth in claim 1, wherein the battery separator film contains a binder resin and a filler wherein a weight ratio of the filler to the binder is 1 to 100.

3. A nonaqueous electrolyte secondary battery separator comprising a battery separator film recited in claim 1.

4. A nonaqueous electrolyte secondary battery comprising a nonaqueous electrolyte secondary battery separator recited in claim 3.

* * * * *